United States Patent
Sethi et al.

(10) Patent No.: US 11,625,462 B2
(45) Date of Patent: Apr. 11, 2023

(54) PROTECTION OF DATA FROM MALICIOUS USER IN COMPUTING DEVICE FROM PRE-BOOT STATE

(71) Applicant: Dell Products L.P., Round Rock, TX (US)

(72) Inventors: Parminder Singh Sethi, Ludhiana (IN); Durai S. Singh, Chennai (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 214 days.

(21) Appl. No.: 17/062,981

(22) Filed: Oct. 5, 2020

(65) Prior Publication Data
US 2022/0107997 A1 Apr. 7, 2022

(51) Int. Cl.
*G06F 21/31* (2013.01)
*G06F 21/57* (2013.01)
*G06F 21/56* (2013.01)
*G06F 21/54* (2013.01)

(52) U.S. Cl.
CPC ............ *G06F 21/316* (2013.01); *G06F 21/54* (2013.01); *G06F 21/566* (2013.01); *G06F 21/575* (2013.01); *G06F 21/577* (2013.01); *G06F 2221/2111* (2013.01)

(58) Field of Classification Search
CPC ...... G06F 21/316; G06F 21/54; G06F 21/566; G06F 21/575; G06F 21/577; G06F 2221/2111

USPC .......................................................... 726/26
See application file for complete search history.

(56) References Cited

U.S. PATENT DOCUMENTS

| | | | | |
|---|---|---|---|---|
| 9,866,546 | B2* | 1/2018 | Brannon | H04L 63/0815 |
| 2011/0225625 | A1* | 9/2011 | Wolfson | H04L 63/205 |
| | | | | 726/1 |
| 2020/0387594 | A1* | 12/2020 | Sandstrom | G06F 21/36 |
| 2022/0012339 | A1* | 1/2022 | Martinez | G06F 9/441 |

OTHER PUBLICATIONS

Dell Technologies, "Dell SupportAssist OS Recovery Support Matrix," Jul. 2020, 25 pages.
Dell Technologies, "Dell SupportAssist OS Recovery User's Guide," May 2020, 27 pages.
Principled Technologies, "Minimize Interruptions to Your Schedule from Operating System Issues," https://www.scribd.com/document/470589155/Minimize-interruptions-to-your-schedule-from-operating-system-issues, Jul. 2020, 11 pages.
Dell, Inc. "SupportAssist for PCs," https://www.dellemc.com/resources/en-us/asset/data-sheets/services/supportassist_for_pcs_and_tablets_data_sheet.pdf, Jul. 2018, 2 pages.

(Continued)

*Primary Examiner* — Jacob Lipman
(74) *Attorney, Agent, or Firm* — Ryan, Mason & Lewis, LLP

(57) ABSTRACT

Data theft protection for a computing device is provided by flagging a suspicious user within the pre-boot environment by systematic evaluation to determine suspicious location and/or anomalous user behavior. Depending on a suspicion score and a risk evaluation, the system automatically triggers one or more actions with respect to the data on the computing device.

20 Claims, 8 Drawing Sheets

(56) References Cited

OTHER PUBLICATIONS

Principled Technologies, "Spend Less Time and Effort Troubleshooting Laptop Hardware Failures," https://i.dell.com/sites/csdocuments/Shared-Content_data-Sheets_Documents/en/la/Principled-Technologies-report-ProSupport-Plus-with-SupportAssist-May2018.pdf, Jun. 2018, 12 pages.

Dell Technologies, "Using BIOSConnectto RecoverSupportAssist OS Recovery Partition," https://www.dell.com/support/article/en-us/sln318764/using-biosconnect-to-recover-supportassist-os-recovery-partition?lang=en, Jul. 24, 2020, 3 pages.

\* cited by examiner

FIG. 4A

```
Add-Type-AssemblyName System.Device #Required to access System.Device.Location namespace $GeoWatcher = New-Object System.Device.Location.GeoCoordinateWatcher #Create the required object $GeoWatcher.Start() #Begin resolving current location while ((($GeoWatcher.Status -ne 'Ready') -and ($GeoWatcher.Permission -ne 'Denied')) {
Start-Sleep -Milliseconds 100 #Wait for discovery.
} if ($GeoWatcher.Permission -eq 'Denied'){
Write-Error 'Access Denied for Location Information'
} else {
$GeoWatcher.Position.Location | Select Latitude,Longitude #Select the relevent results.
}
```

```
PS C:\Users\lakshmi_nalam> C:\Users\lakshmi_nalam\Documents\Sairam_Patent\InProgress\Coordinates\powerShellCommandGeo.ps
1

Latitude           Longitude
--------           ---------
13.0102583744979   77.7182634045064

PS C:\Users\lakshmi_nalam>
```

Settings > Detect Suspicious User

SupportAssist will run these evaluation criteria to automatically detect if your system is in the hands of a suspicious user.

Select the evaluation tests and define threshold values for tests to detect a suspicious user.

| Evaluation criteria | Threshold Value |
|---|---|
| ☑ Location | [10] miles away from regular locations |
| ☑ Booting pattern | ☑ Keys press  ☑ Mouse movement |
| ☑ Incorrect login attempts | [3] |
| ☑ Time take for successful login (in seconds) | Minimum [5]  Maximum [10] |
| ☑ Flight time for keystrokes (in seconds) | Minimum [2]  Maximum [5] |

☐ Allow SupportAssist to auto define threshold values

[Cancel]  [Save]

Settings > Detect Suspicious User > scoring

SupportAssist will assign the following score for the evaluation tests.

| Evaluation criteria | Score | |
|---|---|---|
| ☑ Location | Pass [20] | Fail [-20] |
| ☐ Booting pattern | Pass [ ] | Fail [ ] |
| ☑ Incorrect login attempts | Pass [20] | Fail [-20] |
| ☑ Time take for successful login (in seconds) | Pass [20] | Fail [-20] |
| ☑ Flight time for keystrokes (in seconds) | Pass [20] | Fail [-20] |

☐ Use default values

[Cancel] [Save]

TABLE 1 EXAMPLE SUSPICION SCORE FOR AN AUTHENTIC USER  — 800

| TEST TYPE | RESULT | SCORE |
|---|---|---|
| LOCATION | PASS | 20 |
| BOOTING PATTERN | PASS | 20 |
| INCORRECT LOGIN ATTEMPTS | PASS | 20 |
| TIME TAKEN FOR SUCCESSFUL LOGIN | PASS | 20 |
| FLIGHT TIME BETWEEN KEYSTROKES | PASS | 20 |
| SUSPICION SCORE | | 100 |

FIG. 9

TABLE 2 EXAMPLE SUSPICION SCORE FOR HIGH RISK LEVEL  — 900

| TEST TYPE | RESULT | SCORE |
|---|---|---|
| LOCATION | FAIL | -20 |
| BOOTING PATTERN | FAIL | -20 |
| INCORRECT LOGIN ATTEMPTS | FAIL | -20 |
| TIME TAKEN FOR SUCCESSFUL LOGIN | PASS | 20 |
| FLIGHT TIME BETWEEN KEYSTROKES | FAIL | -20 |
| SUSPICION SCORE | | -60 |

PROTECTION OF DATA FROM MALICIOUS USER IN COMPUTING DEVICE FROM PRE-BOOT STATE

FIELD

The field relates generally to information processing systems, and more particularly to data theft protection in information processing systems.

BACKGROUND

Laptops, notebooks, or other portable computing devices, are frequently lost or stolen. According to research by Gartner Inc., one laptop is stolen every 53 seconds. Laptop theft often occurs in schools and colleges, workspaces, public transport, airports, restaurants and hotels. Victims of laptop theft not only lose their hardware, but they may also lose their sensitive and personal information. Loss of an unencrypted company laptop may result in access to sensitive company information posing a significant risk to their business interests.

Current methods to protect data from a stolen laptop include the use of: (i) data encryption and security software; (ii) asset tracking systems such as LoJack® (CalAmp, Irvine Calif.), STOPMonitor® (STOP, Norwalk Conn.), etc.; and/or (iii) remote data wipe software. However, these methods have their limitations.

SUMMARY

Illustrative embodiments provide techniques for data theft protection in computing devices.

For example, in one illustrative embodiment, a method comprises the step of collecting a current data set when a current user performs a login process to a computing device, wherein the current data set comprises data indicative of one or more behaviors associated with the current user with respect to the computing device and the login process, and wherein at least a portion of the current data set comprises data collected in a pre-boot environment associated with the computing device. The method compares the current data set to a previously-obtained data set collected when an authentic user performed a login process, wherein the previously-obtained data set comprises data indicative of one or more behaviors associated with the authentic user with respect to the computing device and the login process, and wherein at least a portion of the previously-obtained data set comprises data collected in a pre-boot environment associated with the computing device. A score is generated by the method based on the comparison of the current data set to the previously-obtained data set, wherein the score is indicative of a risk level associated with the current user. The method then causes one or more actions to be taken based on the risk level indicated by the generated score.

Advantageously, illustrative embodiments provide data theft protection for a computing device by flagging a suspicious user within the pre-boot environment (e.g., before the user logs into the operating system) by systematic evaluation to determine suspicious location and/or anomalous user behavior, e.g., booting pattern, login attempts, time taken to login, and flight time between keys while entering the password. The evaluation drives the generation of a suspicion score for the user. Depending on a suspicion score and a risk evaluation (e.g., low, high, or medium), the system automatically triggers one or more actions to protect, encrypt and/or wipe the data on the computing device.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4A illustrates an example script for querying system location information according to an illustrative embodiment.

FIG. 4B illustrates an example output of a location query script according to an illustrative embodiment.

FIG. 5 illustrates a data theft protection user interface configured to enable a user to configure evaluation tests and threshold values according to an illustrative embodiment.

FIG. 6 illustrates a data theft protection user interface configured to enable a user to configure a score for each evaluation test according to an illustrative embodiment.

FIG. 8 illustrates a tabular example of suspicion scores for an authentic user according to an illustrative embodiment.

FIG. 9 illustrates a tabular example of suspicion scores for a high risk level according to an illustrative embodiment.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Disadvantages of the current methods of protecting data, mentioned in the background section above, include the following: (i) they are applicable only in the post-boot scenario, i.e., after a user has logged into the operating system of the stolen laptop; (ii) the stolen laptop must be connected to the Internet for data wipe to be initiated; and (iii) security and encryption software not only impacts the performance of the system, but it involves some level of complexity. In general, not all files and folders on the system can be encrypted. A user may choose to encrypt one or more files based on their own threat perception. However, in the case of a theft, a stronger encryption and maximum protection on all files and folders are required.

Illustrative embodiments overcome the above and other drawbacks by providing improved techniques for data theft protection in computing devices.

Figure 1:
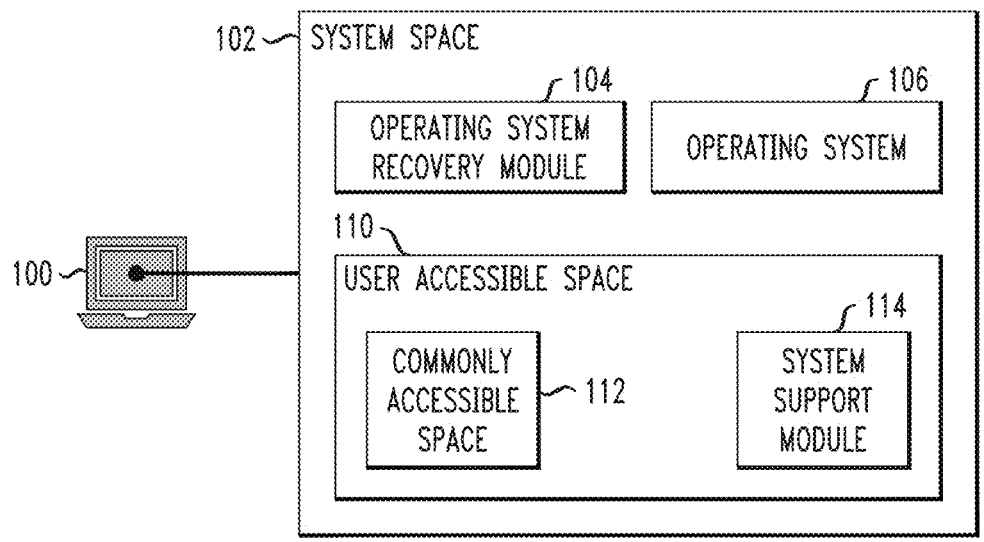
FIG. 1 illustrates a system space for a computing device with which one or more illustrative embodiments can be implemented.

FIG. 1 illustrates a system space for a computing device with which one or more illustrative embodiments can be implemented. More particularly, computing device 100 is assumed to have a system space 102 comprising an operating system (OS) recovery module 104, an operating system 106, and user accessible space 110. The user accessible space 110 comprises a commonly accessible space 112 and a system support module 114. The term "space" as illustratively used herein refers to memory/storage (volatile and/or non-volatile) and/or processor (runtime) environments associated with the computing device 100.

In one or more illustrative embodiments, OS recovery module 104 can comprise an OS recovery product such as, but not limited to, SupportAssist OS Recovery (commercially available from Dell Inc., Hopkinton Mass.). SupportAssist OS Recovery is a pre-boot recovery environment that includes tools for diagnosing and troubleshooting hardware and software issues before the system boots to the operating system. Further, in one or more illustrative embodiments, system support module 114 can comprise a system support product such as, but not limited to, SupportAssist for PCs (commercially available from Dell Inc., Hopkinton Mass.). SupportAssssist for PCs is an application that proactively checks the health of hardware and software of the system by collecting system state information at regular intervals and detecting hardware and software issues that occur on the system. It is realized herein though that the capabilities of SupportAssist for PCs are available only after the primary operating system boots up.

In illustrative embodiments that comprise one or more commercially available products such as, for example, the SupportAssist products illustratively mentioned above, improved data theft functionalities according to illustrative embodiments and as will be explained in detail herein can be implemented in the system space 102 as additions to those commercially available products, enhancements (e.g., modifications, additions, adaptations, etc.) to those commercially available products, or some combinations thereof.

As will be further explained herein in the context of the figures, illustrative embodiments identify anomalous behavior or suspicious activity by collecting information such as, for example, location information and user behavior information. For example, in one or more embodiments, OS recovery module 104 is configured to identify location coordinates of the computing device 100 in the pre-boot environment via a built-in global positioning system (GPS) integrated circuit (chip). System support module 114 is configured to identify location coordinates of the computing device 100 (also using the GPS chip) after the user has logged into the operating system 106, and when the user logs out and/or shuts down. Furthermore, in one or more illustrative embodiments, system support module 114 collects user behavior information such as, but not limited to, information descriptive of: booting pattern including but not limited to user actions while system is booting up; incorrect login attempts prior to successful login; time taken to enter a password for successful login, and flight time between keystrokes.

Figure 2:
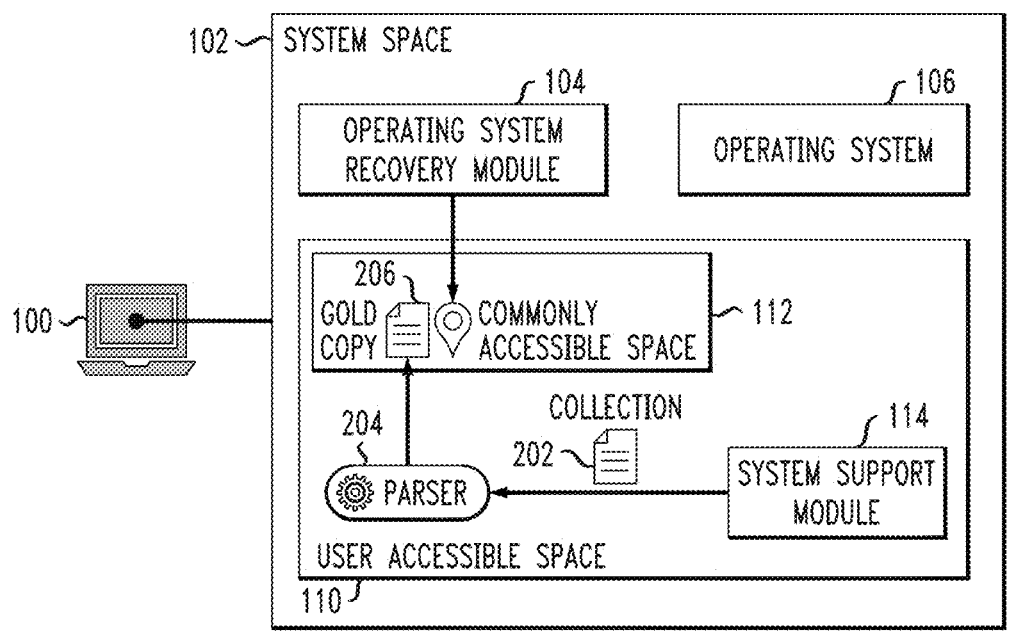
FIG. 2 illustrates collection of user behavioral information in a system space for a computing device according to an illustrative embodiment.

More particularly, FIG. 2 further illustrates collection of user behavior information in a system space 102 for the computing device 100. As shown, the collected information, referred to as collection 202, is parsed by a parser 204 and stored as a copy, referred to as gold copy 206, in the commonly accessible space 112 (e.g., a hard drive) of computing device 100. Parsing can include, but is not limited to, analyzing the collected data into logical syntactic components in order to provide conformability to a logical grammar to enable comparison to subsequently collected data.

Such collecting, parsing and storing of information mapped to the user occurs each time the user logs in, logs out, shuts down, or turns off the computing device 100. Thus, in one or more illustrative embodiments, the gold copy 206 may comprise the following: (i) location coordinates of the computing device 100, e.g., log in location and log out or shut down location; (ii) booting pattern information (e.g., user actions during the time between start of boot and appearance of the login screen), e.g., users may have the habit of pressing a key or key combination, moving the mouse, or clicking the mouse buttons before the login screen appears; (iii) login attempts including the number of times the login attempt failed, prior to a successful login; (iv) flight time between keystrokes for successful logins including duration between keystrokes with the current password, keystroke duration after setting a new password, date and time the password was last changed, the shortest, longest, and average time the user takes to press one key after the other while entering the password successfully; and (v) time taken to enter a password for successful login including duration in seconds or minutes for successful login, and the shortest, longest, and average time the user takes to enter the password for a successful login. The gold copy 206 is updated with every login/logout which makes such information mapping for the user more robust and accurate.

Advantageously, each time a user turns on the computing device 100, OS recovery module 104 detects the location coordinates and pushes them to the commonly accessible space 112 on the hard drive. As the user enters the login password, a suspicion assessment process (further explained below in the context of FIG. 3) is performed within system support module 114. Immediately after or contemporaneous with collection of user behavioral information (such as booting pattern, login attempts, time taken to enter password for successful login, and flight time between keys), the suspicion assessment process systematically evaluates the user behavior collection for the current login attempt versus the gold copy. If the evaluation determines that the variance (delta) between the current user behavior collection and the gold copy is greater than a pre-defined threshold value, the evaluation is flagged as failed. The evaluation also determines an overall suspicion score for that user. Based on the overall suspicion score, predefined rules determine and dictate the action(s) that needs to be taken on the data on the hard drive.

Figure 3:
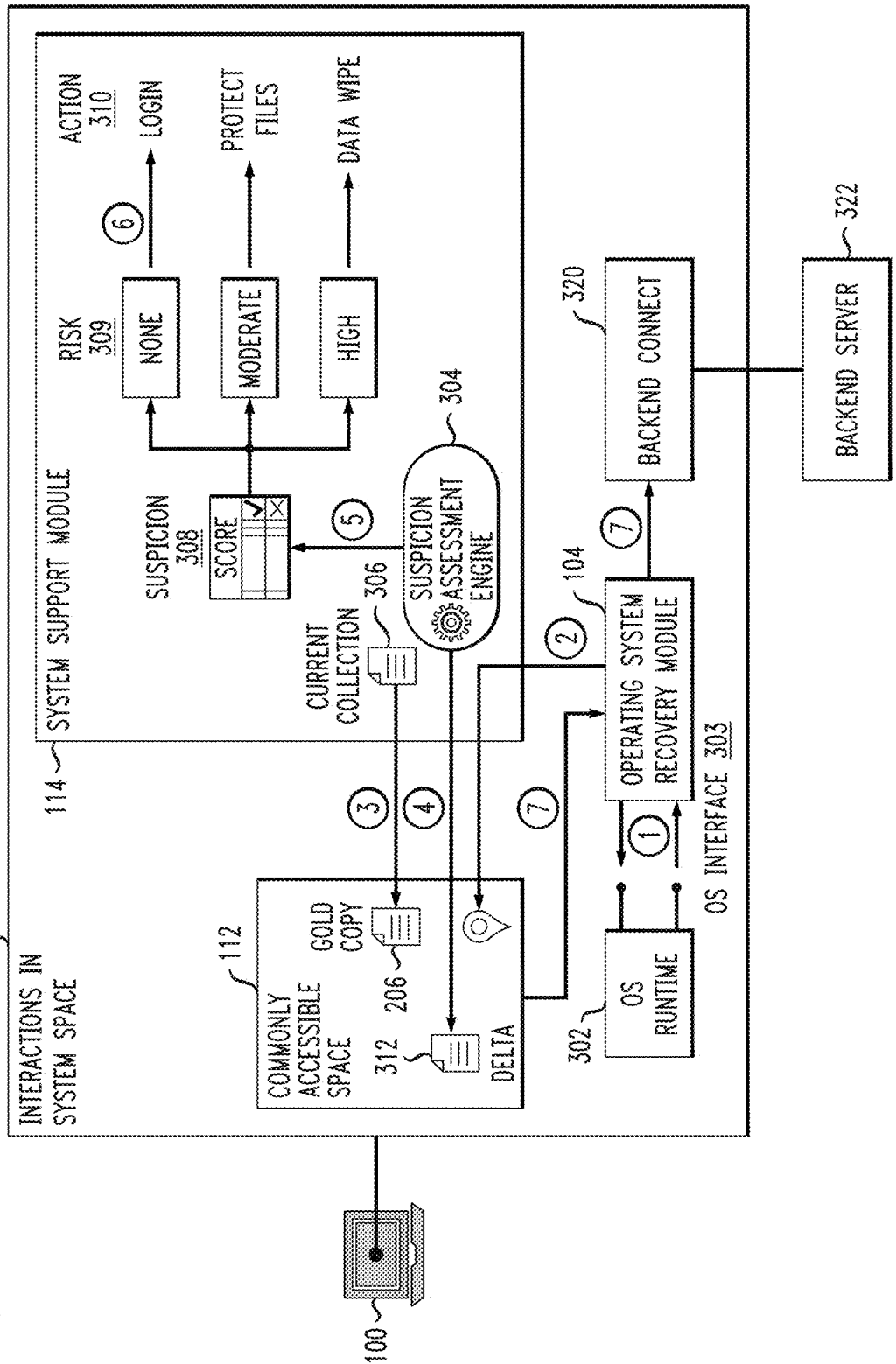
FIG. 3 illustrates an end-to-end flow of suspicion detection and actions in a system space for a computing device according to an illustrative embodiment.

FIG. 3 illustrates an end-to-end flow of suspicion detection and actions in system space 102 for computing device 100 according to an illustrative embodiment. More particularly, events that occur when a current user turns on and tries to log in to computing device 100 (after a gold copy is established for an authentic user) are depicted in FIG. 3. The step numbers in the following description correspond to the numbers in end-to-end flow of suspicion detection and actions in the figure.

Step 1. While the computing device 100 is booting and before the login screen appears, OS recovery module 104 queries the operating system runtime 302 (e.g., Microsoft Windows runtime WinRT) via an OS interface (WinRT interface) 303 to collect location coordinates of the computing device 100. FIG. 4A illustrates an example script 400 for querying system location information. FIG. 4B illustrates an example output 410 of location query script 400.

Step 2. OS recovery module 104 pushes the location coordinates to the commonly accessible space 112 on the hard drive.

Step 3. When the user enters the password, a suspicion assessment engine 304 within system support module 114 collects the user behavior information, referred to as current collection 306, which may include, for example: booting pattern; incorrect login attempts; flight time between keystrokes; and time taken for successful login. After the information is collected, the suspicion assessment engine 304 systematically evaluates the user behavior data for the current login attempt in the current collection 306 versus the gold copy 206. While not expressly shown in FIG. 3, the current collection 306 is parsed similarly to the collected data that comprises the gold copy 206.

Step 4. The comparison between the current collection 306 and the gold copy 206 by the suspicion assessment engine 304 identifies variances, i.e., delta 312, between the two data sets. The delta 312 is saved in a different file within the commonly accessible space 112, so that it can be used to determine the location and user behavioral change of the system between the gold copy 206 and the last time the system (computing device 100) was shut down or turned off.

Step 5. The suspicion assessment engine 304 runs a systematic evaluation of the current collection 306 with pre-defined threshold values. The categories (criteria) of data and pre-defined threshold values can be selected by the user, for example, as shown in illustrative user interface (UI) 500 in FIG. 5. Note that, in certain illustrative embodiments, UI 500 is an additional selection interface page implemented as part of the above-mentioned SupportAssist product. However, alternative user interfaces are contemplated to be within the scope of alternative embodiments.

Thus, in the example in FIG. 5, it is assumed that a systematic evaluation is executed across the selected categories of information including location information, booting pattern, incorrect login attempts, flight time between keystrokes, and time taken for successful login. The user makes the selection in this example by checking the selection field in the interface. Threshold values (as well as other field entries in the interfaces illustrated herein) can be entered, for example, by keyboard and/or pulldown menus (not expressly shown).

If the change in the current collection 306 is beyond the threshold values, the suspicion assessment engine 304 flags the evaluation as failed. After evaluating each category of information, the suspicion assessment engine 304 assigns a corresponding score as shown in suspicion score table 308 in FIG. 3. For example, by default, the score for a passed evaluation is +20 and the score for a failed evaluation is −20, as shown in illustrative user interface 600 in FIG. 6, but can be selected by the user by entering alternative pass/fail score ranges. Note again that, in certain illustrative embodiments, UI 600 is an additional selection interface page implemented as part of the above-mentioned SupportAssist product. However, alternative user interfaces are contemplated to be within the scope of alternative embodiments. The complete systematic evaluation of the collected information results in an overall suspicion score for the user.

Thus advantageously, in this non-limiting example, each of the five categories of evaluations result in a pass or fail status. Each of the evaluations is given a weightage of 20 points. If the test is successful, the test is assigned +20 points. If the test fails, it is assigned −20 points. The score for each test (sub-score) is accumulated to form the overall suspicion score.

Figure 7:
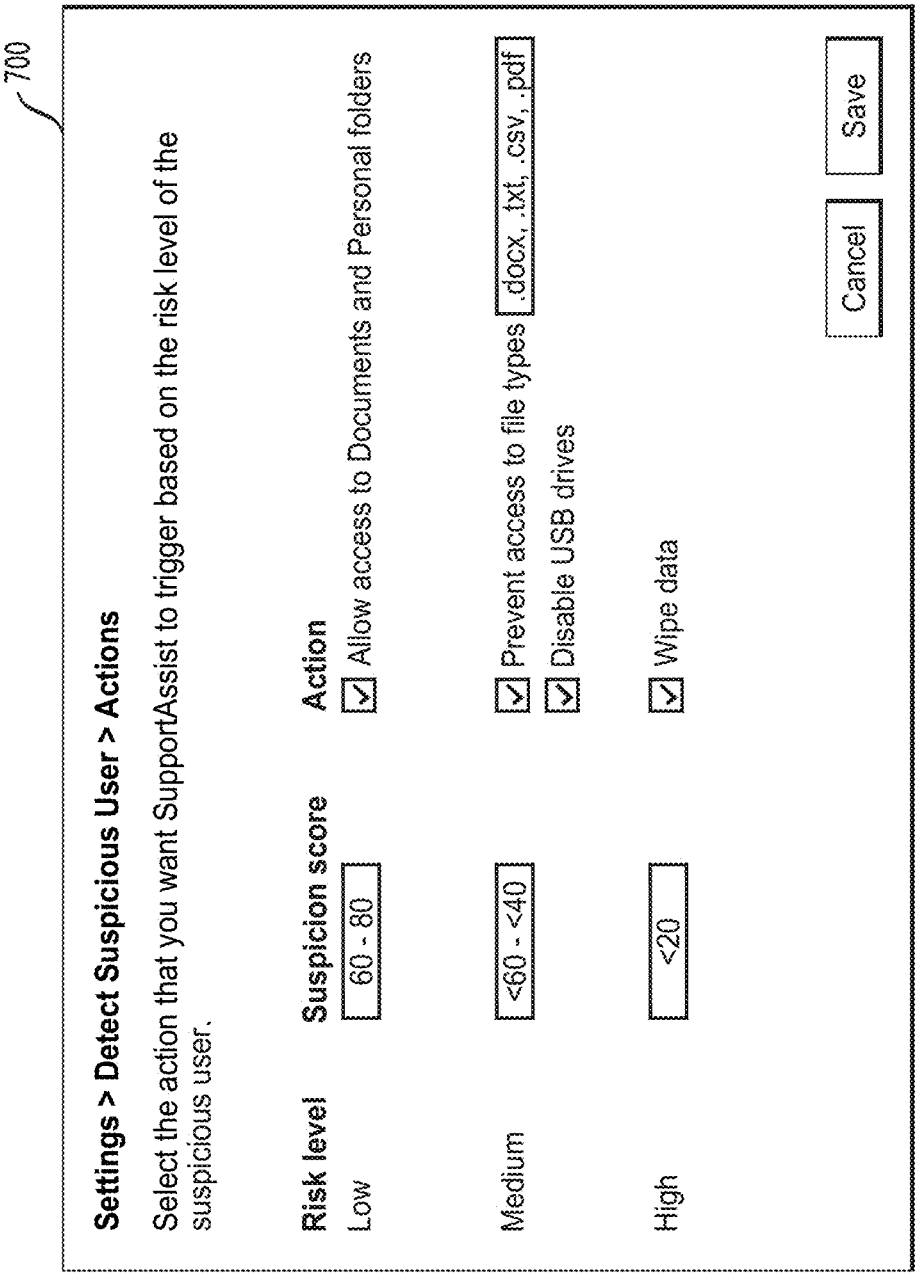
FIG. 7 illustrates a data theft protection user interface configured to enable a user to set actions to be triggered according to an illustrative embodiment.

Step 6. Based on the overall suspicion score, the suspicion assessment engine 304 categorizes the risk level 309 (e.g., high, medium, or low/none). Depending on the risk level 309, the suspicion assessment engine 304 triggers a corresponding action(s) 310, e.g., allow login, protect data, or wipe data. Other actions may be specified by the user and thus triggered (e.g., encryption of data, migration of data, etc.). The association between the score and risk level, and the risk level and actions to be taken are user configurable after successful login as depicted in illustrative user interface 700 in FIG. 7. Note again that, in certain illustrative embodiments, UI 700 is an additional selection interface page implemented as part of the above-mentioned SupportAssist product. However, alternative user interfaces are contemplated to be within the scope of alternative embodiments.

Step 7. OS recovery module 104 retrieves the delta information (delta 312) available in the commonly accessible space 112 for upload through a backend connect interface 320 to a backend server 322. One example of a backend connect interface 320 is BIOSConnect (commercially available from Dell Inc., Hopkinton Mass.). More particularly, if the computing device 100 has Internet access in the pre-boot environment, delta 312 is transmitted to the backend server 322 through BIOSConnect even before the primary OS boots. BIOSConnect is a feature provisioned in Dell laptops that enables the BIOS to connect to backend servers via a wired or wireless Internet connection. Using the BIOSConnect feature, users can repair and recover their operating system by downloading files from the backend server. Illustrative embodiments leverage the capability of BIOSConnect to access the backend server. However, alternative backend connect interfaces are contemplated in alternative embodiments. Thus, after the user has logged in successfully to the computing device 100, whenever Internet connectivity is available, delta 312 can also be transmitted by the OS recovery module 104 to the backend server.

FIGS. 8 and 9 respectively illustrate table 800 (Table 1: example suspicion score for an authentic user) and table 900 (Table 2: example suspicion score for high risk level). Note the overall suspicion score of 100 for the authentic user (owner or legitimate possessor of computing device 100), while the overall suspicion score of −60 is considered a high risk level (likely that the computing device 100 is in the hands of a malicious user). Thus, if the authentic user logs in at a subsequent time after establishing a gold copy, the authentic user will result in a suspicion score that is indicative of relatively low or no risk and thus enable access to a given type of data on the computing device 100, while a malicious user login would result in a suspicion score indicative of high risk and result in access prevention or even intentional data deletion with respect to such given type of data.

Advantageously, illustrative embodiments provide a way to analyze whether the user is an authentic or suspicious user by analyzing user behavioral information gathered in both the pre-boot and post-boot environments. This solution brings intelligence into the system to flag a suspicious user by evaluating the user right from the time the user turns on the system (pre-boot) until the user logs in (post-boot) successfully by using hacked authentication details. This solution is also reliable in situations where the suspicious user is trying to break into the system without connecting to the Internet.

Figure 10:
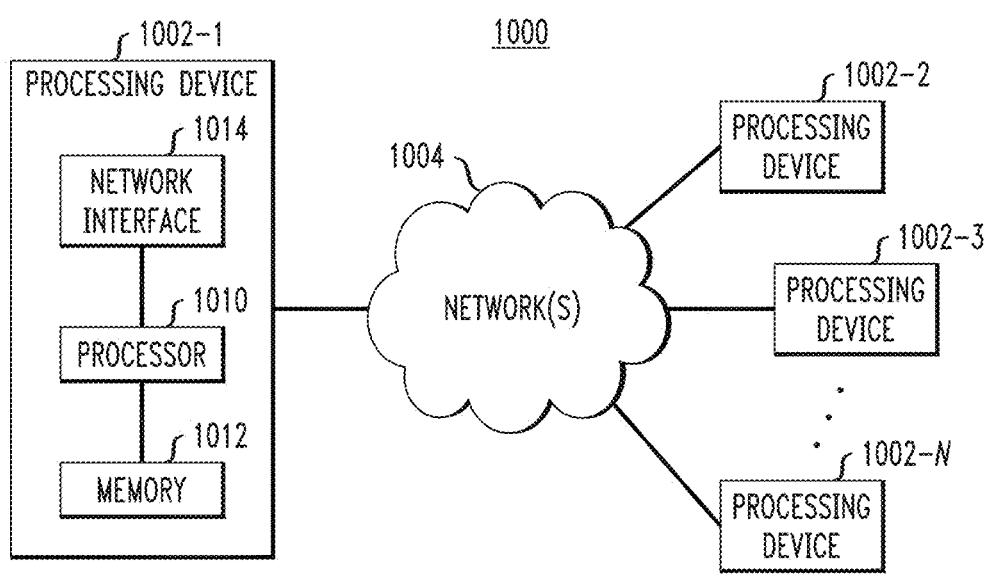
FIG. 10 illustrates a processing platform used to implement an information processing system for data theft protection functionalities for a computing device according to an illustrative embodiment.

FIG. 10 depicts a processing platform 1000 used to implement improved data theft protection according to an illustrative embodiment. More particularly, processing platform 1000 is a processing platform on which a computing environment with functionalities described herein (e.g., FIGS. 1-9 and otherwise described herein) can be implemented.

The processing platform 1000 in this embodiment comprises a plurality of processing devices, denoted 1002-1, 1002-2, 1002-3, . . . 1002-N, which communicate with one another over network(s) 1004. It is to be appreciated that the methodologies described herein may be executed in one such processing device 1002, or executed in a distributed manner across two or more such processing devices 1002. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1002 shown in FIG. 10. The network(s) 1004 represent one or more communications networks that enable components to communicate and to transfer data therebetween, as well as to perform other functionalities described herein.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random-access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 1-3. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the networks 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the system shown as 1000 in FIG. 10 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-10 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
   at least one processing device comprising a processor coupled to a memory;
   the at least one processing device being configured to:
   collect a current data set when a current user performs a login process to a computing device, wherein the current data set comprises data indicative of one or more behaviors associated with the current user with respect to the computing device and the login process, and wherein at least a portion of the current data set comprises data collected in a pre-boot environment associated with the computing device;
   compare the current data set to a previously-obtained data set collected when an authentic user performed a login process, wherein the previously-obtained data set comprises data, selectively determined by the authentic user, indicative of one or more behaviors associated with the authentic user with respect to the computing device and the login process, and wherein at least a portion of the previously-obtained data set comprises data collected in a pre-boot environment associated with the computing device;
   generate a score based on the comparison of the current data set to the previously-obtained data set, wherein the score is indicative of a risk level associated with the current user; and
   cause one or more actions to be taken based on the risk level indicated by the generated score.

2. The apparatus of claim 1, wherein the data indicative of one or more behaviors associated with the current user and the authentic user with respect to the computing device and the login process comprises information indicative of one or more of: a booting pattern, login attempts, time taken to enter a password for a successful login, and flight time between keystrokes.

3. The apparatus of claim 1, wherein the current data set and the previously-obtained data set comprise information indicative of a geographic location of the computing device.

4. The apparatus of claim 1, wherein the data collected in the pre-boot environment associated with the computing device for the current user and the authentic user is collected from an operating system runtime executing on the computing device.

5. The apparatus of claim 1, wherein the comparison compares one or more criteria of the current data set and the previously-obtained data set and generates a sub-score for each of the one or more compared criteria based on a difference between data from the current data set and data from the previously-obtained data set for each of the one or more compared criteria.

6. The apparatus of claim 5, wherein the at least one processing device is further configured to transmit the difference between data from the current data set and data from the previously-obtained data set to a server remote from the computing device.

7. The apparatus of claim 5, wherein sub-scores for the one or more compared criteria are accumulated to generate the score indicative of a risk level associated with the current user.

8. The apparatus of claim 7, wherein the one or more actions taken based on the risk level indicated by the generated score correspond to given data stored on the computing device.

9. The apparatus of claim 8, wherein the one or more actions comprise enabling access by the current user to the given data, preventing access by the current user to the given data, and deleting the current data from the computing device.

10. A method comprising:
    collecting a current data set when a current user performs a login process to a computing device, wherein the current data set comprises data indicative of one or more behaviors associated with the current user with respect to the computing device and the login process, and wherein at least a portion of the current data set comprises data collected in a pre-boot environment associated with the computing device;
    comparing the current data set to a previously-obtained data set collected when an authentic user performed a login process, wherein the previously-obtained data set comprises data, selectively determined by the authentic user, indicative of one or more behaviors associated with the authentic user with respect to the computing device and the login process, and wherein at least a portion of the previously-obtained data set comprises data collected in a pre-boot environment associated with the computing device;
    generating a score based on the comparison of the current data set to the previously-obtained data set, wherein the score is indicative of a risk level associated with the current user; and
    causing one or more actions to be taken based on the risk level indicated by the generated score.

11. The method of claim 10, wherein the data indicative of one or more behaviors associated with the current user and the authentic user with respect to the computing device and the login process comprises information indicative of one or more of: a booting pattern, login attempts, time taken to enter a password for a successful login, and flight time between keystrokes.

12. The method of claim 10, wherein the current data set and the previously-obtained data set comprise information indicative of a geographic location of the computing device.

13. The method of claim 10, wherein the data collected in the pre-boot environment associated with the computing device for the current user and the authentic user is collected from an operating system runtime executing on the computing device.

14. The method of claim 10, wherein the comparison compares one or more criteria of the current data set and the previously-obtained data set and generates a sub-score for each of the one or more compared criteria based on a difference between data from the current data set and data from the previously-obtained data set for each of the one or more compared criteria.

15. The method of claim 14, further comprising transmitting the difference between data from the current data set and data from the previously-obtained data set to a server remote from the computing device.

16. The method of claim 14, wherein sub-scores for the one or more compared criteria are accumulated to generate the score indicative of a risk level associated with the current user.

17. The method of claim 16, wherein the one or more actions taken based on the risk level indicated by the generated score correspond to given data stored on the computing device.

18. The method of claim 17, wherein the one or more actions comprise enabling access by the current user to the given data, preventing access by the current user to the given data, and deleting the current data from the computing device.

19. A computer program product comprising a non-transitory processor-readable storage medium having stored therein program code of one or more software programs, wherein the program code when executed by at least one processing device causes the at least one processing device to perform steps of:

collecting a current data set when a current user performs a login process to a computing device, wherein the current data set comprises data indicative of one or more behaviors associated with the current user with respect to the computing device and the login process, and wherein at least a portion of the current data set comprises data collected in a pre-boot environment associated with the computing device;

comparing the current data set to a previously-obtained data set collected when an authentic user performed a login process, wherein the previously-obtained data set comprises data, selectively determined by the authentic user, indicative of one or more behaviors associated with the authentic user with respect to the computing device and the login process, and wherein at least a portion of the previously-obtained data set comprises data collected in a pre-boot environment associated with the computing device;

generating a score based on the comparison of the current data set to the previously-obtained data set, wherein the score is indicative of a risk level associated with the current user; and causing one or more actions to be taken based on the risk level indicated by the generated score.

20. The computer program product of claim 19, wherein the data collected in the pre-boot environment associated with the computing device for the current user and the authentic user is collected from an operating system runtime executing on the computing device.

* * * * *